(12) United States Patent
Duffett-Smith et al.

(10) Patent No.: US 8,730,105 B2
(45) Date of Patent: May 20, 2014

(54) FINDING THE POSITION OF A MOBILE TERMINAL

(75) Inventors: Peter James Duffett-Smith, Cambridge (GB); Robert Willem Rowe, Cambridge (GB); Murray Robert Jarvis, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 71 days.

(21) Appl. No.: 12/921,765

(22) PCT Filed: Jan. 15, 2009

(86) PCT No.: PCT/EP2009/050451
§ 371 (c)(1),
(2), (4) Date: Nov. 3, 2010

(87) PCT Pub. No.: WO2009/112293
PCT Pub. Date: Sep. 17, 2009

(65) Prior Publication Data
US 2011/0043406 A1 Feb. 24, 2011

(30) Foreign Application Priority Data

Mar. 10, 2008 (EP) .................................... 08102420

(51) Int. Cl.
*G01S 5/10* (2006.01)
(52) U.S. Cl.
USPC ........................................................ 342/464
(58) Field of Classification Search
USPC .................... 342/357.29, 387, 394, 463–465, 342/357.32, 357.31
IPC ........................... G01S 5/10,19/46, 19/49, 19/48
See application file for complete search history.

(56) References Cited

U.S. PATENT DOCUMENTS

| 5,045,861 A | 9/1991 | Duffett-Smith |
| 5,629,710 A * | 5/1997 | Sawada .......................... 342/387 |

(Continued)

FOREIGN PATENT DOCUMENTS

| EP | 1 463 357 A1 | 9/2004 |
| WO | WO 00/73813 A1 | 12/2000 |

(Continued)

*Primary Examiner* — Gregory C Issing
*Assistant Examiner* — Fred H Mull
(74) *Attorney, Agent, or Firm* — Roylance, Abrams, Berdo & Goodman, LLP

(57) ABSTRACT

A method and apparatus are disclosed for determining the position, or change in the position, of a mobile terminal. The terminal has a receiver for receiving the signals from one or more transmission sources at unknown positions and an independent positioning device able to find, when operative, the position of the mobile terminal. The method uses the independent positioning device to measure the position of the mobile terminal at one or more first locations. A respective first set of time or phase offset values of signals received from the transmission sources relative to each other or to a reference in the mobile terminal is measured in the mobile terminal, at each first location. A second set of time or phase offset values are measured in the mobile terminal at a second terminal location where the independent positioning device is not operative and a second set of time or phase offset values of the signals received from the transmission sources, relative to each other or to a reference in the mobile terminal is measured. The values and said first measured terminal position or positions are combined, to thereby calculate the position of the mobile terminal at the second location, or the change in position of the mobile terminal between a first location and the second location.

10 Claims, 3 Drawing Sheets

(56) References Cited

U.S. PATENT DOCUMENTS

| | | | |
|---|---|---|---|
| 5,982,324 A * | 11/1999 | Watters et al. | 342/357.29 |
| 6,021,330 A * | 2/2000 | Vannucci | 455/456.2 |
| 6,445,927 B1 * | 9/2002 | King et al. | 455/456.6 |
| 6,529,165 B1 | 3/2003 | Duffett-Smith et al. | |
| 2002/0019698 A1 * | 2/2002 | Vilppula et al. | 342/357.08 |
| 2003/0125046 A1 * | 7/2003 | Riley et al. | 455/456 |
| 2006/0009235 A1 * | 1/2006 | Sheynblat et al. | 455/456.1 |
| 2006/0106850 A1 | 5/2006 | Morgan et al. | |
| 2007/0252761 A1 * | 11/2007 | Koorapaty et al. | 342/464 |

FOREIGN PATENT DOCUMENTS

| | | |
|---|---|---|
| WO | WO 03/010552 A2 | 2/2003 |
| WO | WO 03/027705 A2 | 4/2003 |

\* cited by examiner

FINDING THE POSITION OF A MOBILE TERMINAL

FIELD OF THE INVENTION

The invention relates to finding the position of a mobile terminal using the signals received by the mobile terminal from transmission sources such as the base-stations of a digital telecommunications network.

BACKGROUND

Technology for positioning mobile radio terminals using the signals received from one or more transmitters has been widely used for many years. Such systems include terrestrial networks of transmitters (e.g. LORAN-C) and networks of satellites (e.g. the Global Positioning System, GPS) deployed specifically for the purpose of locating the receiver, as well as methods that use general-purpose radio networks such as cellular mobile telephone networks (e.g. U.S. Pat. No. 6,529,165) or TV and radio transmitter networks. (e.g. U.S. Pat. No. 5,045,861).

Within a cellular mobile telephone network, for example, the position of the mobile terminal may be based on the identity of the serving cell, augmented by information such as the time delay between the serving transmitter and mobile terminal, the strengths of signals received from the serving and neighbouring transmitters, or angles of incidence of received signals. An improved position may be obtained using the observed time difference of arrival (OTDA) of signals received at the mobile terminal from two or more transmission sources.

OTDA methods give good position accuracy using only the signals available within a cellular radio network. However, in unsynchronised networks such as GSM and W-CDMA networks for example, they require the transmission time offsets of the transmitters to be determined in order to solve the positioning equations. This can be done using location measuring units (LMUs) having additional receivers. LMUs are placed at known locations so that their OTDA measurements can be converted directly into a network timing model (e.g. WO-A-00-73813).

Alternatively, a technique (U.S. Pat. No. 6,529,165) may be used in which measurements of signals from a number of geographically disparate transmitters at known positions made, for example, by two geographically disparate mobile terminals at unknown positions, may be used to compute simultaneously both the positions of the mobile terminals and all the timing offsets between the measured transmitters, without the need for LMUs.

A problem associated with these network-based positioning systems is the need to know the locations of the transmitters themselves. For example, the computing node at which the calculation of the position of the mobile terminal is made must have access to a database of the latitude, longitude, and height above a defined datum of every base station in the network. However, such information can be commercially sensitive, and therefore difficult to obtain, and even when it is available the database can contain errors. If the position calculation is carried out in the mobile terminal itself, the database (which may be substantial in size) must be sent to the mobile terminal thereby consuming communications bandwidth. Another problem is that the mobile terminal must be registered on the network in order to receive the information, and cannot therefore operate in an entirely autonomous mode.

The present invention is aimed at overcoming these problems by providing a method by which the position of a mobile terminal (such as one operating in a mobile communications network) may be found autonomously. The position of the mobile terminal can be calculated within the mobile terminal itself, albeit with reduced accuracy, without the need to have access to a database of base-station locations.

SUMMARY OF THE INVENTION

According to the invention there is provided a method of determining the position, or change in the position, of a mobile terminal having a receiver for receiving the signals from one or more transmission sources at unknown positions, the mobile terminal also having an independent positioning device able to find, when operative, the position of the mobile terminal, the method comprising the steps of using said independent positioning device, measuring the position of the mobile terminal at one or more first locations;

measuring in the mobile terminal, at each first location, a respective first set of time or phase offset values of signals received from the transmission sources relative to each other or to a reference in the mobile terminal;

measuring in the mobile terminal, at a second terminal location where said independent positioning device is not operative, a second set of time or phase offset values of the signals received from the transmission sources, relative to each other or to a reference in the mobile terminal; and combining said values and said first measured terminal position or positions, and thereby calculating the position of the mobile terminal at the second location, or the change in position of the mobile terminal between a first location and the second location.

The alternative positioning system carried by the mobile terminal, such as GPS, is used, in effect, to calibrate the signals received from the transmission sources. Later, when the alternative system is not available, for example when the mobile terminal has moved inside a building so that the satellite signals are too weak to measure, the position of the mobile terminal may still be determined using the calibration data and new measurements of the signals received from the transmission sources.

The transmission sources may, in principle, be of any sort. For example, they may be independent public broadcast stations, or television stations, but in particular they may be the base stations of a communications network such as a GSM or W-CDMA digital network. The only requirement is that the signal transmitted by each transmission source supports the measurement of the time or phase of receipt of a characteristic of the signal. For example, an amplitude-modulated (AM) signal readily lends itself to the measurement of the phase of the carrier wave. In another example the signals from a GSM transmitter provide many 'signatures' within the modulation which may be used to mark the time of receipt, such as frame boundaries or synchronisation bursts. The locations of the transmission sources may or may not be known when the computation of the position of the mobile terminal is made, and it is a particular feature of the present invention that such information is not required (though it can be used if known).

The mobile terminal may be any terminal able to receive the signals from the transmission sources. It may have an antenna adapted to respond to the signals from the transmission sources, which is connected to a receiver able to carry out the required functions such as amplification, filtering, frequency changing, demodulation etc., in order to render the received signal into a form which is suitable for the measurement of the time or phase. The receiver may be a single-channel device able to switch between the signals radiated by the transmission sources (as in usually the case in a terminal of a GSM network), or it may have more than one channel so that it can receive multiple signals in parallel. In the case of a CDMA terminal, a single channel receiver is able to receive the signals from plural transmission sources simultaneously as the signals are all transmitted in a common radio-frequency channel but with orthogonal spreading codes, the separation between the signals from different base stations being carried out in digital signal-processing stages.

The independent positioning device may be any device able to measure the position of the mobile terminal independently of the transmission source signals. This may be a Global Navigation Satellite System (GNSS) such as the Global Positioning System (GPS), Galileo, Compass, or the Quasi Zenith Satellite System (QZSS) etc., although any alternative system may be used, e.g. the Long-Range Navigation system (LORAN-C). A particular feature of the present invention is that it is able to back up such a system when it fails, so that the position of the mobile terminal can be found without interruption. For example, it is well-known that GNSS systems fail when in sufficiently-challenging environments such as inside buildings, or under dense foliage, because the signals strengths of the satellite signals are then attenuated below a critical detection threshold.

The first terminal locations are those at which the independent positioning device is operational and able to find the position of the mobile terminal. There must be at least one such first terminal location but there may be many more. At each first terminal location the transmission source receiver receives the signals from one or more of the transmission sources, and the phase or time offset value of each signal is measured. The measurement of each signal may be made with respect to a signal generated within the mobile terminal from a reference source such as a crystal oscillator. Alternatively, the signal from one of the transmission sources may be taken as the reference and the measurements of the others made with respect to it.

The second terminal location is one at which the independent positioning device is inoperative, for example because the satellite signals it uses have been attenuated by building structures, but at which the position of the mobile terminal needs to be found nevertheless. The present invention shows how measurements of the values of the time or phase offsets of the signals received from the transmission sources can be used to calculate the position of the mobile terminal at the second location. Alternatively, in some applications, it may be desirable to find the vector joining a first terminal location to the second terminal location, in effect finding the change in the position of the mobile terminal.

Although it is a primary aim of the present invention to find the position of the mobile terminal using the signals from transmission sources at unknown positions, it can also be used to find the positions of the transmission sources themselves when enough position and time or phase offset values have been obtained at multiple first terminal locations. In this way, a mobile terminal operating according to the invention may eventually build up a database of transmission-source positions so that subsequent second terminal locations may be found using methods known in the art such as described in U.S. Pat. No. 6,529,165. Similarly, for a mobile terminal moving over a small-enough area, the relative bearings of the transmission sources may be obtained. In some applications, the ranges of the transmission sources from the mobile terminal may also be calculated.

When the position of the mobile terminal is calculated at the second terminal location, it may be possible to determine a region of uncertainty associated with the calculated position. Such a region of uncertainty may have the form of an ellipse, known as an 'error ellipse', the size, eccentricity, and orientation of which defines the region within which the uncertainty is less than a defined value such as one standard deviation. In a system having many mobile terminals, the error ellipses associated with each one may be used to select a subset of mobile terminals whose measurements are of good enough quality to be passed to a server and used to calculate a model of the transmission time offsets of the transmission sources.

The method of the invention will now be illustrated mathematically. The known position of the mobile terminal at the $j^{th}$ of N first terminal locations (j=1 ... N) is denoted by the lower-case position vector $r_j$. The time of receipt of the signal at that position from the $k^{th}$ of M base-station transmitters (k=1 ... M) is denoted by $t_{jk}$ and is given by $$\upsilon t_{jk} = |r_j - b_k| + \alpha_k + \epsilon_j, \quad (1)$$

where $b_k$ is the position vector defining the position of the $k^{th}$ base station with respect to the same origin as used for $r_j$, $\alpha_k$ is the transmission time offset, $\epsilon_j/\upsilon$ is the offset of the handset clock at the $j^{th}$ first position, and $\upsilon$ is the speed of the radio waves. The vertical bars denote the modulus of the enclosed vector. The values of $t_{jk}$, $\alpha_k/\upsilon$, and $\epsilon_j/\upsilon$ are all measured with respect to a common clock. For simplicity, we confine our analysis to a plane. In equations (1), there are two unknown values associated with each base-station position (e.g. latitude and longitude), one unknown transmission time offset associated with each transmitter, and one unknown terminal clock offset associated with each first terminal position, making a total number of 3M+N unknown values over the ranges of j and k. On the other hand, M time-offset measurements are made at each of the N first positions, making a total of MN measurements. In principle, therefore, and provided that the first positions are spaced suitably, all of the unknown values may be deduced from the measurements provided that the inequality MN≥3M+N is satisfied. For example, five first positions (N=5) and three base stations (M=3) give 3M+N=14 whilst MN=15, so the inequality is satisfied in this case.

When the mobile terminal has moved to a second terminal location, denoted by the upper-case position vector R (with respect to the origin used for $r_j$ and $b_k$), the mobile terminal makes M time offset measurements, $T_k$, of the base-station signals. The values of $b_k$ and $\alpha_k$ have already been determined as described above with regard to Equation (1). The M equations (for k=1 ... M) are given in the form:

$$\upsilon T_k = |R - b_k| + \alpha_k + E, \quad (2)$$

where E is the mobile terminal clock offset at the second terminal location. In equations (2) there are just three unknown values, the latitude and longitude of the mobile terminal, and the terminal clock offset. Therefore measurements of the receive time offsets $T_k$ of the signals from three or more base stations are sufficient to deduce the position of the mobile terminal.

In some applications, the mobile terminal may include means for measuring the terminal clock offset directly, so that the values of $\epsilon_j$ are determined with respect to a known time reference, such as GPS time. The effect of this is to decouple the equations (1) from each other, and to reduce, in effect, the number of unknown quantities to be determined.

BRIEF DESCRIPTION OF THE DRAWINGS

One example of a method according to the invention and an example of the system in which it may be deployed will now be further described with reference to the accompanying drawings, in which.

DETAILED DESCRIPTION OF THE EXAMPLES

Figure 1:
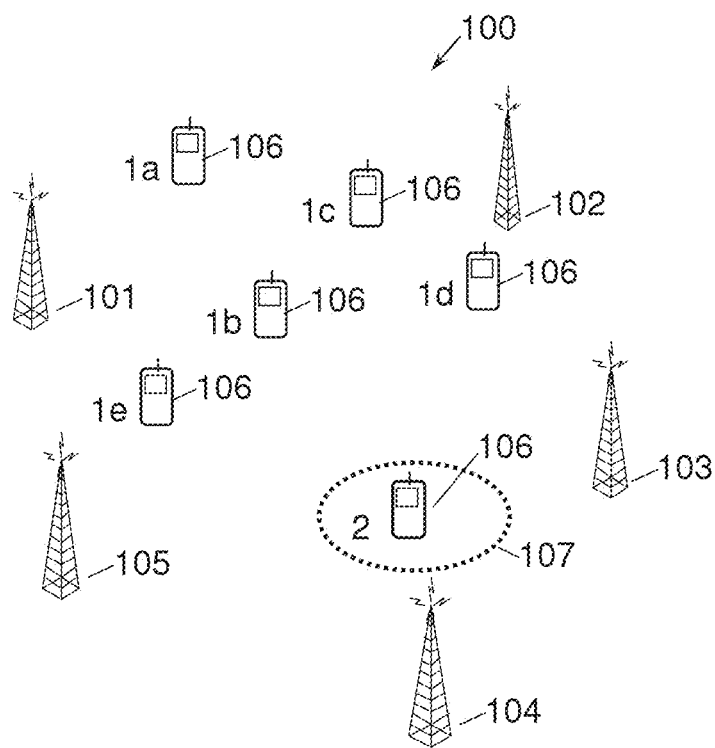
FIG. 1 illustrates a mobile terminal operating in a GSM network.

The operation of one example of the present invention is illustrated with reference to FIG. 1. A network 100 of Base Transceiver Stations (BTS) 101-105 of a digital communications network, a GSM network in this case, has a mobile terminal 106 operating within it and shown at plural locations 1a-1e, 2. At each of first terminal locations 1a-1e, the mobile terminal uses a GPS receiver to find its position, and at the same time makes measurements of the time offset values of the signals received from BTSs 101-105, relative to the terminal clock (see below). In this example, the GPS positions and the sets of timing measurements are combined according to equations (1) above and the equations are solved for the positions of the BTSs 101-105 and the transmission time offsets of the transmitters attached to them.

At a later time, the mobile terminal 106 moves to a second terminal location 2 at which the GPS receiver is inoperative because of excessive attenuation of the signals from the GPS satellites. The mobile terminal makes a set of timing measurements on the signals from a subset 103-105 of the BTSs, and these are combined according to equations (2) which are then solved to find the position of the mobile terminal. At the same time, an uncertainty ellipse 107 is estimated.

In another example, the step of calculating the positions and transmission time offsets of the BTSs 101-105 is not carried out explicitly and the measurements are all combined in one calculation step to find the mobile terminal's position at the second location.

Figure 2:
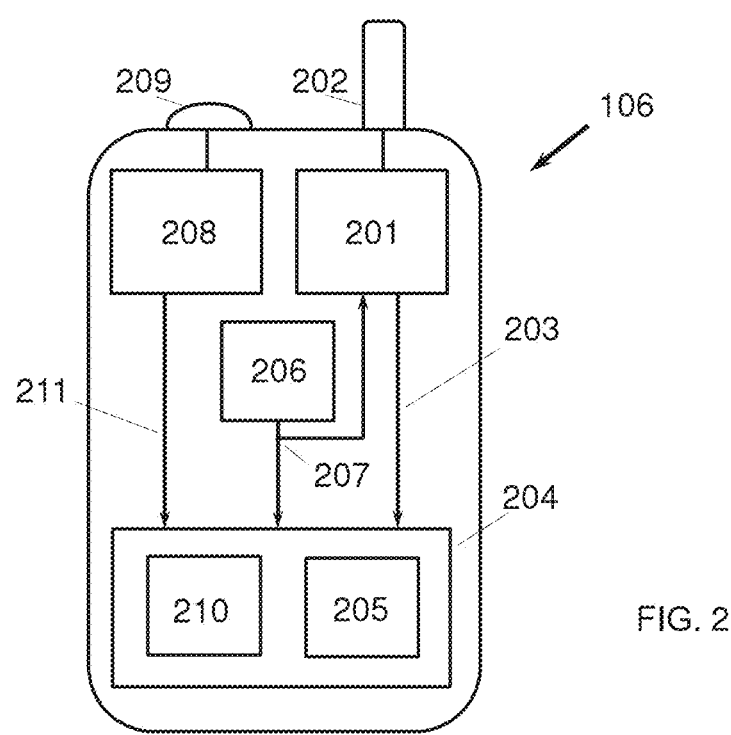
FIG. 2 shows the functional elements of a terminal.

FIG. 2 shows the schematic diagram of the main functional blocks of a mobile terminal operating according to the invention. The mobile terminal 106 includes, as an 'independent positioning device', a GPS receiver 208 connected to a GPS antenna 209 through which it receives the signals from GPS satellites. Positions calculated by device 208 are sent to a processor 204 via a link 211. The mobile terminal 106 also includes a receiver 201, for receiving the signals from one or more BTSs 101-105, connected to an antenna 202 through which it receives the signals from the BTSs. The mobile terminal also has an oscillator 206 which provides the terminal clock signals for the processor 204 and receiver 201 via link 207. These clock signals provide a reference in the mobile terminal.

The receiver 201 contains the amplifiers, filters, mixers, local oscillators etc. usually found in such devices, and therefore these are not shown separately in FIG. 2. The receiver can receive on a single radio-frequency channel at any one time, but is able to switch radio frequencies rapidly in order to receive synchronisation bursts (found in all GSM networks carried on the Broadcast Control Channel) transmitted by the different BTSs 101-105. The offset values relative to the reference clock signals at which the synchronisation bursts are received are measured and sent to the processor 204 via the link 203.

The processor 204 stores the time offset values measured by receiver 201, and the mobile terminal positions measured by GPS receiver 208, in processor memory 205. When the mobile terminal has made measurements at sufficient first terminal locations 1a-1e, a software program is run by the processor which uses the data stored in memory 205 to calculate the positions and transmission time offsets of the BTSs using equations (1). These are stored in a second memory 210 of the processor 204.

In operation, when the mobile terminal is at a second location 2 and the GPS receiver 208 is unable to find the position of the mobile terminal, for example because the terminal has moved inside a building where the satellite signals are attenuated, the receiver 201 is still able to receive the signals from the BTSs 103-105 because the GSM signals are much stronger than the satellite signals. The mobile terminal measures a set of time offset values relative to the clock signals on link 207 and sends these to the processor 204 via link 203. The processor 204 runs a second software program which uses the data stored in second memory 210 together with the current set of timing offset values to calculate the position of the mobile terminal using equations (2). The error ellipse 107 may also be estimated if desired.

Figure 3:
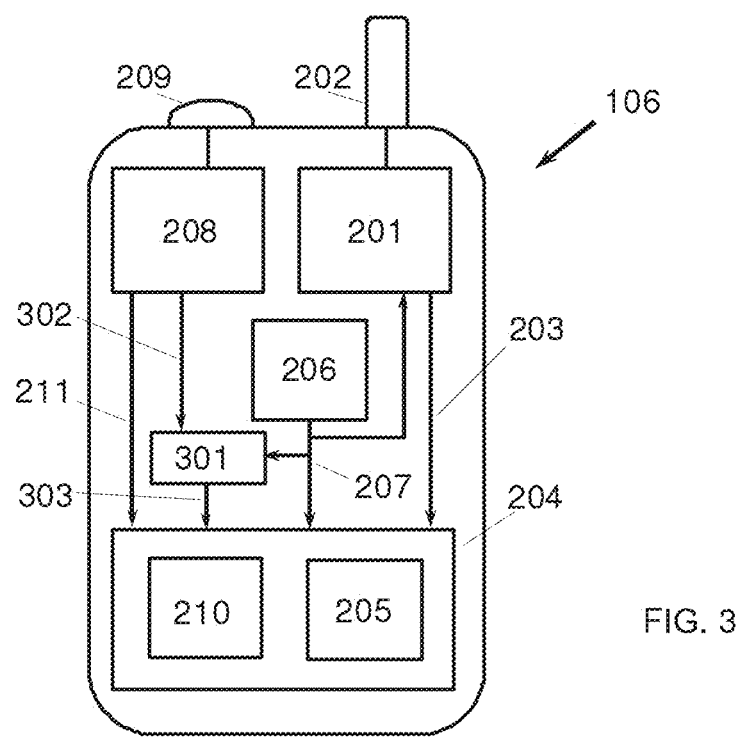
FIG. 3 shows additional functional elements of a mobile terminal.

In another example of the method, the mobile terminal's reference clock offsets relative to a reference time are determined. The mobile terminal 106 makes measurements at first terminal locations as described above. However, it carries a timer unit 301 (see FIG. 3) which enables it to measure times relative to GPS time. At approximately the same time as a GPS position fix is obtained at a first terminal location (1a-1e), a pulse is sent from the GPS receiver 208 to the timer unit 301 via link 302. This pulse is sent at a precisely-known GPS time. Timer unit 301 timestamps the pulse arrival using the clock signals from the oscillator 206 present on link 207. At approximately the same time as the GPS position fix is obtained, a set of times of arrival of the signals from the BTSs 101-105 is measured using the receiver 201. These times of arrival are each time-stamped using the clock signals from the oscillator 206 present on link 207 and can thus be related to the previously-measured GPS time. According to Equations (1), timing observations made on the signals from a particular BTS by the mobile terminal 106 at the same location differ by the elapsed time of the terminal clock, in this case oscillator 206. Similarly the GPS timestamps of these observation sets differ by the same elapsed time. Hence the variables $\epsilon_j$ are not needed in Equations (1) which now contain just the unknowns $\alpha_k$ and $b_k$ and therefore decouple into independent equation sets which can be solved in turn for each of the BTSs.

The invention claimed is:

1. A method of determining the position of a mobile terminal having a receiver for receiving signals from a plurality of transmission sources where one or more of the transmission sources are at unknown positions, the mobile terminal also having an independent positioning device able to find, when operative, the position of the mobile terminal, the method comprising the steps of using said independent positioning device, measuring the position of the mobile terminal at one or more first locations;

measuring by the mobile terminal, at each first location, a respective first set of relative time or phase offset values of signals received from the transmission sources relative to each other or to a reference in the mobile terminal, where the position of one or more of these transmission sources is unknown;

calculating transmission time offsets of the signals transmitted by said transmission sources using the measured position at said one or more first locations and said respective first sets of relative time or phase offset values of signals received from the transmission sources;

measuring by the mobile terminal, at a second terminal location where said independent positioning device is not operative, a second set of relative time or phase offset values of the signals received from the transmission sources, relative to each other or to a reference in the mobile terminal, where the position of one or more of these transmission sources is unknown; and combining said second set of relative time or phase offset values and the calculated transmission time offsets, and thereby calculating by the mobile terminal the position of the mobile terminal at the second location.

2. A method according to claim 1, the transmission sources are the base stations of a digital communications network.

3. A method according to claim 1, wherein the independent positioning device is a global navigation satellite system receiver.

4. A method according to claim 1, wherein the measuring of relative time or phase offset values of the signals received from the transmission sources is made with respect to a signal generated within the mobile terminal.

5. A method according to claim 1, wherein the measuring of relative time or phase offset values of signals received from the transmission sources is made with respect to the signal from one of the transmission sources.

6. A method according to claim 1, further comprising the steps of:

repeating the method of claim 1 multiple times such that the first set of relative time or phase offset values are measured at multiple first terminal locations; and determining the positions of the transmission sources themselves using the time or phase offset values measured at the multiple first terminal locations.

7. A method according to claim 6, further including creating in the mobile terminal a database of transmission-source positions.

8. A mobile communications terminal having a receiver configured to receive communications signals from transmission sources of a communications network, and measure sets of relative time or phase offset values of the communications signals received from transmission sources relative to each other or to a reference in the mobile terminal, wherein the position of one or more of the transmission sources is unknown;

an independent positioning device configured to find, when operative, a position of the mobile terminal; and a processor configured to calculate transmission time offsets of the signals transmitted by said transmission sources using the measured position at one or more first locations of the terminal and respective first sets of relative time or phase offset values of signals received from the transmission sources where the position of one or more of the transmission sources is unknown, and combine a set of relative time or phase offset values measured at a second location of the terminal with the calculated transmission time offsets, and thereby calculate at the second location, the position of the mobile terminal.

9. A mobile communications terminal according to claim 8, wherein the receiver is a single-channel device able to switch between the signals radiated by the transmission sources.

10. A mobile communications terminal according to claim 8, wherein the receiver is a multi-channel device arranged to receive multiple communications signals in parallel.

* * * * *